United States Patent [19]

Staege

[11] 4,166,731
[45] Sep. 4, 1979

[54] PROCESS FOR THE CONTINUOUS INTRODUCTION OF FINE-GRAINED AND DUST-LIKE SOLIDS INTO A PRESSURIZED REACTION SPACE

[75] Inventor: Hermann Staege, Essen, Fed. Rep. of Germany

[73] Assignee: Krupp-Koppers GmbH, Essen, Fed. Rep. of Germany

[21] Appl. No.: 840,164

[22] Filed: Oct. 6, 1977

[30] Foreign Application Priority Data

Oct. 23, 1976 [DE] Fed. Rep. of Germany ....... 2648048

[51] Int. Cl.$^2$ ............................................... F17C 7/02
[52] U.S. Cl. .......................................... 62/46; 62/48; 62/62; 62/331; 48/197 R; 414/217
[58] Field of Search ..................... 62/331, 332, 514 R, 62/62, 46, 48; 48/86, 197 R, 206, 210, 215; 214/17 B

[56] References Cited

U.S. PATENT DOCUMENTS

| | | | |
|---|---|---|---|
| 3,775,071 | 11/1973 | Hoffert et al. | 214/17 B |
| 3,868,817 | 3/1975 | Marion et al. | 48/215 |
| 3,950,146 | 4/1976 | Funk | 48/197 R |
| 3,976,443 | 8/1976 | Paull et al. | 48/197 R |
| 4,049,133 | 9/1977 | Staudinger | 214/17 B |

*Primary Examiner*—Ronald C. Capossela
*Attorney, Agent, or Firm*—Michael J. Striker

[57] ABSTRACT

Fine-grained solids including dust-like solids are introduced into a reaction space which is under pressure such as used in the gasifying of coal is effected by mixing carbon dioxide in the form of dry ice with the solids after the solids have been precooled to a temperature of $-80°$ C., then bringing the formed mixture of solids and dry ice up to the pressure required for introduction into the reaction space, thereafter subjecting the dry ice to sublimation to separate it from the solids and subsequently, after pressure release and cooling to the desublimation comparative, reconverting the gaseous carbon dioxide into dry ice which then is circulated into the next run while the solids are passed into the reaction space.

7 Claims, 1 Drawing Figure

U.S. Patent    Sep. 4, 1979    4,166,731
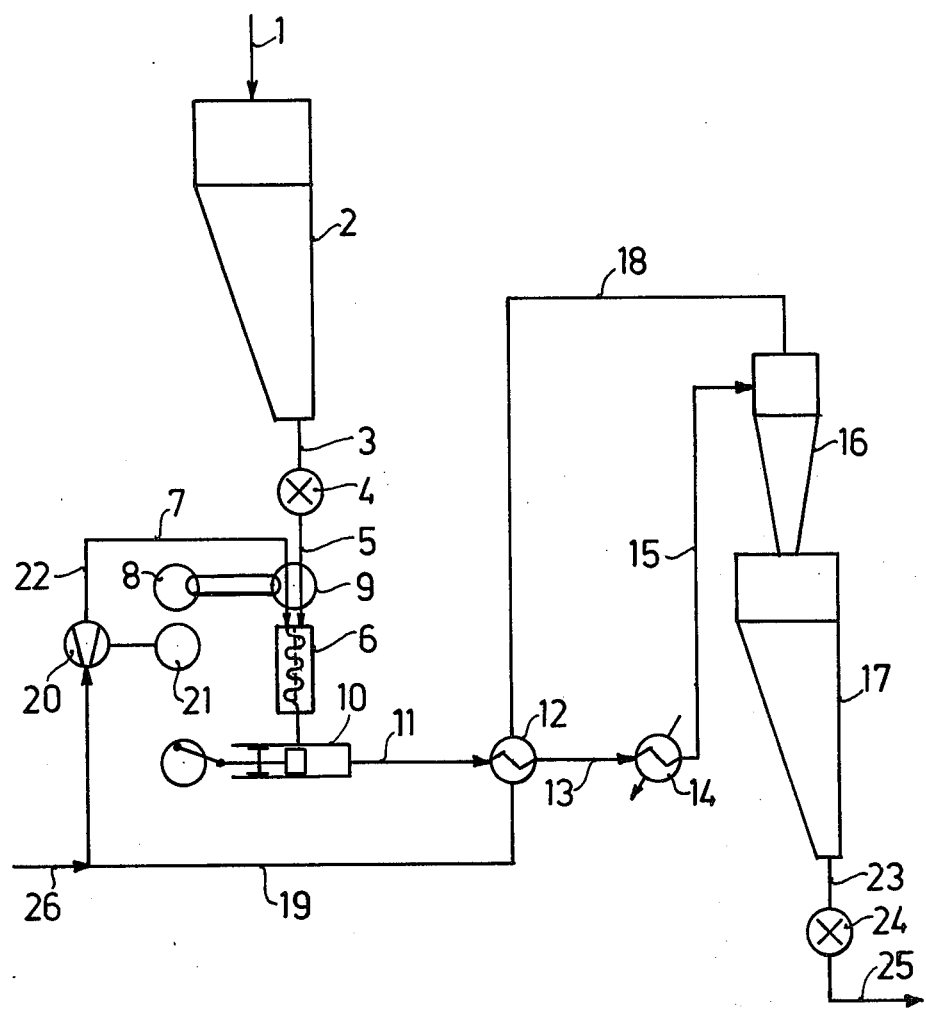

PROCESS FOR THE CONTINUOUS INTRODUCTION OF FINE-GRAINED AND DUST-LIKE SOLIDS INTO A PRESSURIZED REACTION SPACE

BACKGROUND OF THE INVENTION

The invention relates to a process for the continuous introduction of fine grain solids including dust-like solids into a reaction space which is under pressure. The invention is particularly of interest for the introduction of finely divided coal into a gasifier under pressure such as concurrent flow or fluidizing bed gasifiers.

It will be understood, however, that the process of the invention can also be used for the introduction of solids into reaction spaces where other chemical, physical and/or metallurgical reactions are involved.

It has already been proposed to mix finely divided and even dust-like coal with a suitable liquid, preferably water in order to introduce the coal into the gasifier where it is subjected to gasification under pressure. The necessary pressure of the mixture of coal and liquid such as water is obtained, for instance by pump action. In the heating zone a steam-coal dispersion is then formed from the mash of coal and liquid and this involves a further pulverization of the coal. The dispersion is then passed into the pressure gasifier.

A flow diagram of this process which is known under the name "Texaco Process" will be found, for instance, in the publication "Chemie-Ingenieur-Technik", 46 (1974), page 949, FIG. 7.

In this prior art process the vaporous flow medium is passed into the pressure gasifier more or less united with the coal dust. It therefore takes part in the subsequent reaction such as partial oxidation. This, in many cases, leads to undesirable results, for instance because of a high proportion of water vapor in the reaction mixture.

It is therefore an object of the invention to provide for a process for the continuous introduction of fine-grained, including dust-like, solids into a reaction space which is under pressure in which process the conveyor or flow medium does not take part in the subsequent reaction but can be recirculated for further use. It is an object also thus to lower the necessary energy. Another object of the invention is to provide for a flow medium which is not toxic and not explosive.

SUMMARY OF THE INVENTION

This object is met by a process which comprises the following steps:

(a) mixing frozen carbon dioxide ($CO_2$ snow or dry ice) with the solids after precooling the solids to a temperature of $-80°$ C.;

(b) then bringing the formed mixture of solids and dry ice to up to the pressure required for the introduction into the reaction space;

(c) then subjecting the dry ice to sublimation to separate it from the solids and subsequently, upon pressure release and cooling to the desublimation temperature, reconverting the gaseous carbon dioxide to dry ice; and (d) recirculating the formed dry ice into the next run while passing the solids into the reaction space.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The drawing is a flow sheet diagram illustrating an example of the invention.

DESCRIPTION OF THE PREFERRED EMBODIMENTS

The invention as appears from the above uses dry ice as the flow medium. This medium is nontoxic and nonexplosive and can be converted with relatively small amount of energy from the solid into the gaseous stage and reverse.

The invention will be best understood by reference to the following example and the flow diagram illustrating this example.

The example relates to the introduction of coal dust into a gasifier which operates at a pressure of about 30 at absolute.

It will be seen that the coal dust is introduced through a duct 1 into the storage bin 2 which is at atmospheric pressure. Through duct 3 and the feeder 4 and duct 5 the coal dust then is passed into the mixing screw 6.

The duct 5 as appears from the drawing passes through a cooling device 9 in which low temperature cooling of the coal dust to about $-80°$ C. is obtained. Simultaneously, low cooled carbon dioxide in gaseous form is passed through the duct 7 and is likewise further cooled in the cooler 9 to $-80°$ C. It will be noted that both the duct 7 and the duct 5 pass through the cooling device 9.

Since at about $-78°$ to $-80°$ C. the gaseous carbon dioxide is desublimated to dry ice there is formed in the mixing screw a mixture of dry ice and low temperature coal dust which is passed into the pressure device 10 which in the example shown is in the form of a pressure piston. The mixture of dry ice and coal dust is then concentrated in the pressure device to the pressure required for introduction into the gasifier.

The condensed mixture is thereafter forced through duct 11 into the heat exchanger 12 in which part of the dry ice present in the mixture is sublimed. The mixture then passes through the duct 13 into the preheater 14 in which the dry ice is completely sublimed.

The thus formed mixture of gaseous carbon dioxide and coal dust passes then through the duct 15 to the cyclone 16. In the cyclone the separation of the coal dust is effected and the latter is collected in the intermediate storage bin 17. The coal dust then is passed through duct 23 into the adjustable feeder 24 and from there through duct 25 to the gasifier (not shown).

The gaseous carbon dioxide which has been separated in the cyclone 16 from the coal dust passes through duct 18 to the heat exchanger 12 where it is subjected to cooling so as to reconvert part of it into dry ice. The carbon dioxide passes through duct 19 into a turbine 20 which acts as a pressure release. The $CO_2$ pressure is there reduced to about 1.05 at absolute and at the same time a further cooling is effected. The carbon dioxide which now has been cooled to a point close to the desublimation temperature then passes through ducts 22 and 7 to the cooling device 9 where it is again cooled so as to completely consist of dry ice. This closes the circuit and the dry ice can now again be used in the manner described above.

The refrigeration requirements for the entire system are furnished by the refrigeration plant 8 which is connected with the cooling device 9. Through the duct 26 additional carbon dioxide can be introduced in order to compensate for any losses. The turbine 20 which provides the pressure release is connected with a current generator 21. Thus, the energy produced in the turbine can be employed to generate current.

The following are the specific figures regarding the introduction of one metric ton of coal dust into the gasifier:

| Pressures in system: | | | |
|---|---|---|---|
| in cyclone | 16 | ~ 35 | at. absol. |
| in duct | 22 | ~ 1.05 | " |
| in duct | 11 | ~ 39 | " |
| in mixing screw. | 6 | ~ 1.02 | " |
| Temperatures in system: | | | |
| in mixing screws | | ~ −80° C. | |
| in duct | 15 | ~ +2° C. | |
| in duct | 22 | ~ −75° C. | |
| Dust saturation: | | | |
| in duct | 15 | about 2 kg/Nm$^3$ = 75 kg/m$^3$ | |
| Cold balance: | | | kcal/t |
| cooling of the coal dust | | | 36 750 |
| desublimation of the $CO_2$ | | | 150 730 |
| losses | | | 15 000 |
| | | | 200 480 |
| recovered in the pressure release turbine | | 20 | 103 200 |
| effective requirement | | = | 99 280 |
| Energy requirements: | | | |
| refrigeration plant | 8 | about | 80.0 kWh/t |
| mixing screw | 6 | " | 0.7 kWh/t |
| Compressor | 10 | " | 8.0 kWh/t |
| feeder | 4 | " | 0.3 kWh/t |
| feeder | 24 | " | 0.3 kWh/t |
| | | | 89.3 kWh/t |

The advantages of the process of the invention may be summarized as follows:

(1) Carbon dioxide is used as the flow or conveyor medium. It is nontoxic and nonexplosive. It can be converted with a low amount of energy from the gaseous into the solid stage and reverse.

(2) The energy requirements for the process are accordingly low as the above dates show and present a considerably more favorable picture than in other processes.

(3) Through the circulation of the flow medium it is accomplished that no solid, liquid or gaseous materials are discharged into the surrounding atmosphere.

(4) The flow medium can be separated from the solids without difficulty and does not pass into the reaction space which is under pressure. Therefore, an undesirable participation of the flow medium in the reactions taking place in the reaction space is definitely excluded.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A process for the continuous introduction of fine-grained and dust-like solids into a pressurized reaction space, the said process comprising
   (a) mixing carbon dioxide in the form of dry ice with the solids after precooling the solids to a temperature of −80° C.;
   (b) then bringing the formed mixture of solids and dry ice up to the pressure required for the introduction into the reaction space;
   (c) then subjecting the dry ice to sublimation to separate it from the solids;
   (d) subjecting the resulting gaseous $CO_2$ pressure release and cooling to the desublimation temperature so as to reconvert it to dry ice; and
   (e) recirculating the formed dry ice into the next run while passing the solids into the reaction space.

2. The process of claim 1 wherein the separation of the dry ice and solids is effected in a cyclone or filter device.

3. The process of claim 1 wherein the solids are collected in a separate zone prior to passing them into the reaction space.

4. The process of claim 1 wherein the pressure release for the gaseous carbon dioxide is carried out by passing the carbon dioxide into a turbine which provides useful energy.

5. The process of claim 4 wherein the turbine operates a current generator.

6. The process of claim 4 wherein the gaseous carbon dioxide is then subjected to further cooling so as to reconvert it into dry ice which is then recycled into the process.

7. The process of claim 1 wherein the solids consist of coal dust to be introduced into a pressurized reaction space.

* * * * *